Sept. 23, 1924.

G. E. MILLER

MEANS FOR CUTTING UNDERCUT THREADS

Filed June 6, 1922

1,509,438

WITNESS
F. F. Dilworth

INVENTOR.
G. E. Miller
BY F. N. Barber
ATTORNEY.

Patented Sept. 23, 1924.

1,509,438

UNITED STATES PATENT OFFICE.

GEORGE E. MILLER, OF ETNA, PENNSYLVANIA.

MEANS FOR CUTTING UNDERCUT THREADS.

Application filed June 6, 1922. Serial No. 566,239.

*To all whom it may concern:*

Be it known that I, GEORGE E. MILLER, a citizen of the United States, residing at Etna, in the county of Allegheny and State of Pennsylvania, have invented new and useful Improvements in Means for Cutting Undercut Threads, of which the following is a specification.

My invention relates to apparatus for cutting undercut threads on the exterior surfaces of pipes, bolts, and the like, and on the interior surfaces of pipe-couplings and other hollow articles.

It is the object of this invention to provide a tap and a die with collapsible cutting dies which cut undercut threads. In the construction of deep wells, strings of pipe are used made up of short lengths connected end to end by having their adjacent ends screwed into couplings. The two faces of each thread usually make forty-five degree angles with the axis of the pipe-couplings and the pipe-sections. Such strings of pipe are often three or four thousand or more feet long, the threads between each coupling and its coacting pipe-ends supporting the entire string below the coupling. The weight which a coupling is required to sustain runs into several tons. The weight of the suspended pipe causes a wedging action between the mutually engaged surfaces of the threads of the pipes and their couplings, the wedging action being in many cases so strong as to cause the metal of the pipe to spring enough to allow the string to become separated, and the lower portion to drop down the well. It is the object of this invention to provide means containing collapsible dies for cutting undercut threads which will interlock or interhook with each other on the cooperating threaded members, such as a pipe and a coupling, for example.

My invention is shown applied to a tap like that illustrated in my patent No. 1,342,754, granted June 8, 1920. It may also be applied to devices for externally threading articles.

Figure 1:
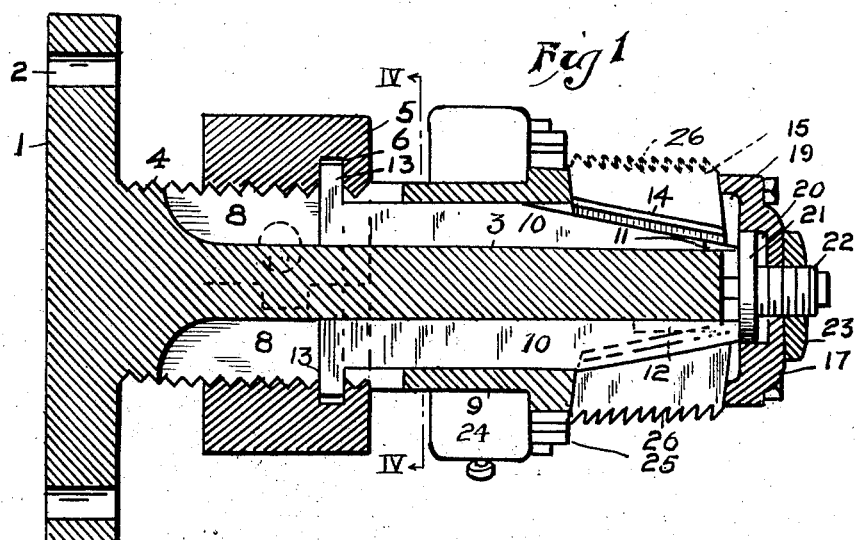
Figure 2:
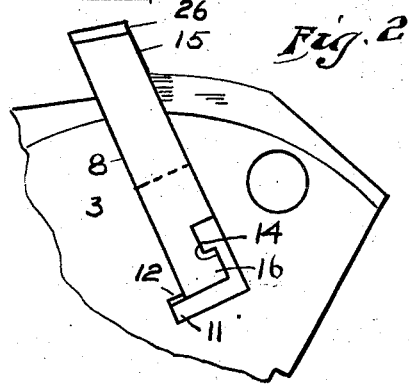

Referring to the accompanying drawing, Fig. 1 is a central longitudinal section of a tap containing my invention, the upper threading die being shown in dotted lines; Fig. 2, an end view of a portion of the same with the cap 17 removed, the die 15 being shown tangential; and Fig. 3, a diagrammatic view illustrating the angular relation of the threads or teeth with respect to the axis of the tool or the direction of movement of the die; Fig. 4 is a cross section of Fig. 1 on the line IV—IV.

On the drawing, 1 is the metal base having the holes 2 for screws for attaching the tap to a rotary shaft of a threading machine. 3 is a steel body projecting from the base 1 and arranged at right angles thereto. The end of the body nearest to the base 1 is provided with the threads 4 on which the nut 5 works. The nut 5 has toward its outer end the annular internal groove 6.

The body 3 is provided with a number of longitudinal slots 8 open at their forward ends and at the periphery of the body, except at the intermediate portion where the slots are covered by the ring 9 which is welded or brazed to the body.

A steel slide 10 is slidable in each slot 8 and has at its inner edge a lateral rib or lug 11 fitting the undercut slot 12 in the body to prevent the slide from rising in the slot. The base of each slot is parallel with the axis of the body and its sides fit the slide closely to prevent any side motion of the slide. The slides lie beneath the ring. The inner end of each slide has a lug 13 arranged in the groove 6, so that, as the nut is turned, the slides will be moved lengthwise.

The forward ends of the slides are beveled on their outer faces and toward their outer ends, and undercut grooves 14 are made in the sides of the slides parallel with the tapered surfaces, the slots lying just above the lug 11.

The threading dies 15 have their sides adapted to fit between the sides of the slots 8, have their inner edges tapered to correspond to the taper of the wedges, but reversed as to the direction of the taper, and have their sides provided with the ribs 16 fitting the grooves 14. The outer edges of the dies have thread-cutting teeth 26.

17 is a cap fitting against the outer end of the body 3. The inner face of the cap is hollowed out at 19 to provide a clearance for the ends of the slides. The cap has a central internal recess 20 to receive the stop-disk 21 to which the screw 22 working in a hole in the cap is connected. By turning the screw, the disk may be adjusted to stop the outer movement of the slides at such a position as to limit the outward throw of the dies as desired. The adjustment of the disk is fixed by the jam-nut 23 on the screw 22.

The ring 9 is provided with the lugs 24, each carrying a cutter 25 for trimming the end of an article at the conclusion of a cutting operation. The ring 9 also serves to strengthen the tool and hold the slides in place.

Figure 3:
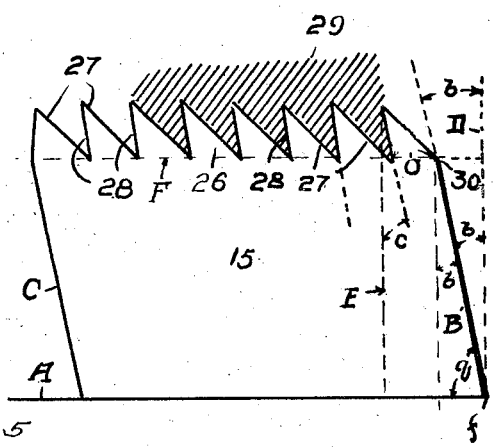
Figure 4:
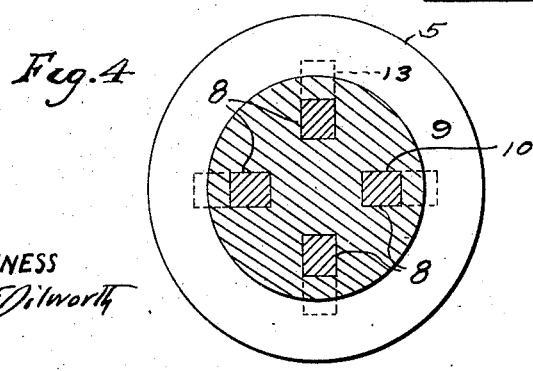

Referring to Fig. 3, the line A represents a line parallel with the axis of a threading tool, and the lines B and C are parallel lines indicating the ends of a collapsible cutting die, or the direction in which the die moves in the body of the tool. The line B makes the acute angle $b$ with the line D drawn normal to the line A at the point $f$ where A and B meet, and the acute angle $q$ with the line A at the same point. The teeth or threads 26 have their faces 27 and 28 inclined in the same general direction as the line B is inclined with respect to the line A. The undercut face 28 of a tooth 26 makes the angle $c$ with the line E drawn perpendicularly from the tip of a tooth or thread 26 to the line A. It is evident that the angle $c$ may be equal to the angle $b$ or smaller than the angle $b$, but that it may not be larger than the angle $b$, because in the latter case the face 28 will be interlocked with the contacting face of the thread in the article 29 being threaded. Also, it is clear that the angle $o$, which is the angle the tooth-face 27 makes with A or a parallel F thereto, may equal the angle $q$, which is the angle the line B makes with the line A or a parallel F thereto, or that it may be smaller than the angle $q$, and that it may not be larger than the angle $q$, that is, the face 27 on Fig. 3 may not be rotated on its base-point 30 beyond the line B extended.

The die teeth may be inclined at any angle to the lines A and B and a thread can be cut readily, but the dies can not be collapsed unless the inclinations of the tooth faces 27 and 28 are within certain limits in dies in which the faces 27 and 28 are both inclined in the same general direction, as defined in the claims, that is, where both faces incline to the right or to the left. If the angle $c$ were larger than it is, the line of the tooth face 28 would if extended intersect the line B, which simply means that the teeth are locked in the threads of the article 29, and the only way the tap could be taken out of the article would be by screwing it out. The angle $c$ could be made less than $b$, that is, less than shown, and still the dies could be retracted in the tool. This is apparent from Fig. 3. If the angle $c$ be diminished to its limit, that is, until it coincides with the line E, still the die could run down the line B freely. The left hand faces of all the die teeth would at once become spaced from the line E, the space increasing as the die slides down.

The angle $o$, the angle 27 makes with F, could be increased from that shown until the line 27 coincides with the line B extended upwardly in dots. The line 27 could not pass to the right of the line B extended, because the die face 27 would interlock with the article 29 and the tap would have to be screwed out of the article in order to get it out.

The operation of my invention is as follows: When the nut 5 is rotated in the proper direction, the slides 10 will move to the right and cause the dies to be moved radially outwardly to the position shown in Fig. 1, the dies moving slightly to the left owing to the beveling of their ends. The operation of this invention is like that of the device of my said patent except that the dies of the patent move outwardly at right angles to the axis of the tool. The tool as shown in Fig. 1 is used to tap threads in a manner well known. When the threading operation has been concluded, the nut 5 is rotated in the reverse direction, whereupon the dies 15 are readily retracted, provided the inclinations of the tooth faces 27 and 28 are kept within the limits defined herein.

The principles of this invention may be extended to machines or tools employed for threading the exterior of articles where they have retractile or collapsible cutting dies. Fig. 3 may be regarded as showing an inwardly movable die 15 working in the exterior face of an article 29, as well as an outwardly movable die working in the interior face of a hollow article.

The nut 5 is rotated to cause the slides 10 to move to their outer position as shown in Fig. 1. This movement of the slides causes the dies 15 to move outwardly so that the teeth 26 are beyond the periphery of the cap 17. The threading tool thus adjusted and caused to rotate in the usual manner for tools of the class to which my invention belongs, is pushed into a hollow body, as a coupling, in which the teeth 26 cut threads. When the threading operation is complete, the tool may be withdrawn from the threaded body by reversing the rotation of the tool, which is the only way taps with collapsible dies known to me prior to my invention could be withdrawn where the dies have inclined teeth. However, with my invention, the dies may be collapsed or drawn inwardly without rotating the tool, merely by running the nut 5 toward the base 1, this being possible by reason of the direction of movements of the dies and the inclinations of the faces of the teeth 26, as shown in Fig. 3 and as described with references to Fig. 3.

I claim—

1. In a thread-cutting device, a body, a collapsible thread-cutting die carried thereby and means guiding the die at an angle to the axis of the device, and means for moving the die in the body, the cutting face of the die having thread-cutting teeth, each with one face undercut and inclined in the same general direction as the direction of movement of the die, but at an angle not greater than the angle which the said direction of movement makes with a line perpendicular to the axis of the device, whereby the dies may, after the device has cut a thread, be moved inwardly in their said guiding means so as to withdraw the teeth of the dies from the thread without rotating the said device.

2. In a thread-cutting device, a body, a collapsible thread-cutting die carried thereby and means guiding the die at an angle to the axis of the device, and means for moving the die in the body, the cutting face of the die having thread-cutting teeth, each with one face undercut and inclined in the same general direction as the direction of movement of the die, but at an angle not greater than the angle which the said direction of movement makes with a line perpendicular to the axis of the device, and the remaining face of each tooth making an angle with the said axis equal to the angle which the said guiding means makes with the said axis, or smaller than the latter angle, whereby the dies may, after the device has cut a thread, be moved inwardly in their said guiding means so as to withdraw the teeth of the dies from the thread without rotating the said device.

3. In a thread-cutting device, a body, a collapsible thread-cutting die carried thereby and means guiding the die at an angle to the axis of the device, and means for moving the die in the body, the cutting face of the die having thread-cutting teeth, each with one face making an angle with the axis of the device not greater than the angle which the said guiding means makes with the said axis, whereby the dies may, after the device has cut a thread, be moved inwardly in their said guiding means so as to withdraw the teeth of the dies from the thread without rotating the said device.

Signed at Pittsburgh, Pa., this 26th day of May 1922.

GEO. E. MILLER.